United States Patent [19]

Sugiyama et al.

[11] Patent Number: 5,758,303
[45] Date of Patent: May 26, 1998

[54] AUTOMATIC TRANSMISSION LEARNING CONTROL APPARATUS

[75] Inventors: Hideharu Sugiyama; Ikuo Hirose; Yoshifumi Fujita, all of Shizuoka, Japan

[73] Assignee: Jatco Corporation, Fuji, Japan

[21] Appl. No.: 564,796

[22] Filed: Nov. 29, 1995

[30] Foreign Application Priority Data

Nov. 30, 1994 [JP] Japan .................. 6-297033

[51] Int. Cl.$^6$ .................. B60K 41/06; F16H 61/26
[52] U.S. Cl. .................. 701/53; 477/121; 477/158; 701/58; 701/66
[58] Field of Search .................. 364/424.08, 424.083, 364/424.084, 424.087, 424.089, 424.091; 477/115, 121, 156, 158, 163; 701/51, 53, 54, 58, 60, 62, 66

[56] References Cited

U.S. PATENT DOCUMENTS

| | | | |
|---|---|---|---|
| 4,930,079 | 5/1990 | Kondo | 364/424.087 |
| 4,981,053 | 1/1991 | Yamaguchi | 74/866 |
| 5,126,940 | 6/1992 | Haubner | 364/424.083 |
| 5,151,858 | 9/1992 | Milunas et al. | 364/424.087 X |
| 5,163,342 | 11/1992 | Pollack et al. | 364/424.087 X |
| 5,251,509 | 10/1993 | Pollack et al. | 364/424.087 X |
| 5,285,523 | 2/1994 | Takahashi | 364/424.088 X |
| 5,289,741 | 3/1994 | Debs et al. | 364/424.091 X |
| 5,558,600 | 9/1996 | Tsukamoto et al. | 364/424.084 X |
| 5,571,060 | 11/1996 | Becker et al. | 477/159 |

FOREIGN PATENT DOCUMENTS

| | | |
|---|---|---|
| 42 17 270 | 12/1993 | Germany. |
| 38 84 370 | 1/1994 | Germany. |
| 1-169164 | 7/1989 | Japan. |

*Primary Examiner*—Gary Chin
*Assistant Examiner*—Edward J. Pipala
*Attorney, Agent, or Firm*—Foley & Lardner

[57] ABSTRACT

An automatic transmission learning control apparatus comprises a memory for storing parameters in memory locations specified for respective throttle valve position ranges. A physical quantity related to a gear shift operation made in an automatic transmission is measured. The parameter stored in the memory location specified by the throttle valve position range including the sensed throttle valve position is updated in a direction to bring the measured physical quantity into agreement with a target value. The parameter stored in the memory location specified by the throttle valve position range including the existing throttle valve position is used to control the gear shift operation. The throttle valve position ranges have a smaller width for a throttle valve position causing a greater rate of change of a torque inputted to the automatic transmission with respect to a throttle valve position change.

8 Claims, 10 Drawing Sheets

| GEAR RATIOS | FRICTION ELEMENTS | R/C | H/C | L/C | B/B | L&R/B | LOW O.W.C |
|---|---|---|---|---|---|---|---|
| R | | ○ | | | | ○ | |
| D RANGE | 1ST SPEED | | | ○ | | | ○ |
| | 2ND SPEED | | | ○ | ○ | | |
| | 3RD SPEED | | ○ | ○ | | | |
| | 4TH SPEED | | ○ | | ○ | | |
| ENGINE BRAKE | 1ST SPEED | | | ○ | | ○ | (○) |
| | 2ND SPEED | | | ○ | ○ | | |
| | 3RD SPEED | | ○ | ○ | | | |
| | 4TH SPEED | | ○ | | ○ | | |

○ = ENGAGED

FIG.4

| GEAR POSITIONS \ SOLENOIDS | 1ST SHIFT SOLENOID | 2ND SHIFT SOLENOID |
|---|---|---|
| 1ST SPEED | ON | ON |
| 2ND SPEED | OFF | ON |
| 3RD SPEED | OFF | OFF |
| 4TH SPEED | ON | OFF |

| $n_1, n_2$ | CORRECTION FACTOR |
|---|---|
| 7 | S(7) |
| 6 | S(6) |
| 5 | S(5) |
| 4 | S(4) |
| 3 | S(3) |
| 2 | S(2) |
| 1 | S(1) |
| 0 | S(0) |

TH ↑ with values: 8/8, 5/8, 3.5/8, 3/8, 2.5/8, 2/8, 1.5/8, 1/8, 0/8

AUTOMATIC TRANSMISSION LEARNING CONTROL APPARATUS

BACKGROUND OF THE INVENTION

This invention relates to an automatic transmission learning control apparatus utilizing learned parameters stored in memory locations specified for respective throttle valve position ranges to control the automatic transmission.

For example, Japanese Patent Kokai No. 1-169164, which corresponds to U.S. Pat. No. 4,981,053, discloses an automatic transmission learning control apparatus for controlling the duty cycle of a control signal applied to control the line pressure in the automatic transmission during gear shift operation. The learning control apparatus includes a memory for storing learned correction factors in memory locations specified for respective throttle valve position ranges. The learned correction factors are utilized to control the duty cycle of the control signal in a direction to bring the inertia phase time into agreement with a target value.

In the conventional automatic transmission learning control apparatus, however, eight throttle valve position ranges, which specify the respective memory locations, are provided to have the same width over the entire throttle valve-position range from. For example, the same correction factor is utilized for the throttle valve position range from 2/8 to 3/8 in spite of the fact that the input torque produced at a throttle valve position of 2/8 is quite different from that produced at a throttle valve position of 3/8.

Furthermore, the throttle valve position range from 5/8 to 8/8, where the input torque changes in a very small range and the requirement for gear shift operation occurs at a very small frequency, is divided into three throttle valve position ranges. For this reason, much time is required for the duty cycle correction factors to reach their appropriate values during the learning operation for these three throttle valve position ranges.

SUMMARY OF THE INVENTION

It is a main object of the invention to provide an improved automatic transmission learning control apparatus which can ensure smooth gear shift operation and good gear shift feel when the throttle valve position is in a range causing a greater rate of change of the automatic transmission input torque with respect to the throttle valve position change and which can shorten the time required for the correction factors to reach their appropriate values during the learning operation when the throttle valve position is in a range where the gear shift operation is required at a low frequency.

There is provided, in accordance with the invention, an automatic transmission learning control apparatus for use in an automotive vehicle including an internal combustion engine having a throttle valve and an automatic transmission. The apparatus comprises sensor means sensitive to a degree to which the throttle valve opens for producing a first sensor signal indicative of a sensed throttle valve position, physical quantity measuring means for measuring a physical quantity related to a gear shift operation made in the automatic transmission, and memory means for storing parameters in memory locations specified for respective throttle valve position ranges. The throttle valve position ranges have a smaller width for a throttle valve position causing a greater rate of change of a torque inputted to the automatic transmission with respect to a throttle valve position change. The apparatus also includes updating means for updating the parameter stored in the memory location specified by the throttle valve position range, including the sensed throttle valve position, in a direction to bring the physical quantity into agreement with a target value, and control means for employing the parameter stored in the memory location specified by the throttle valve position range, including the sensed throttle valve position, to control the gear shift operation.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
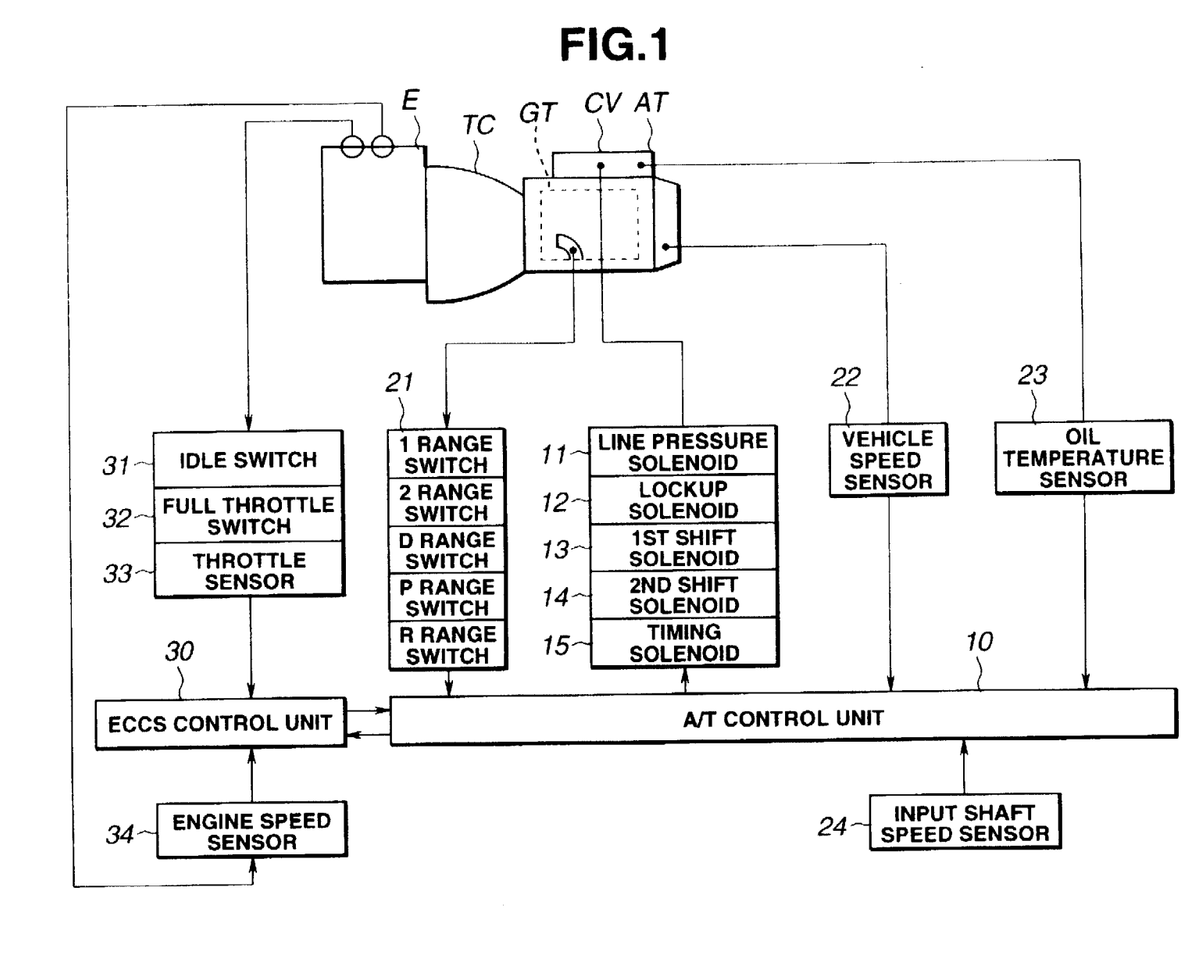
FIG. 1 is a schematic block diagram showing one embodiment of an automatic transmission learning control apparatus made in accordance with the invention.

With reference to the drawings and in particular to FIG. 1, there is shown a schematic block diagram of an automatic transmission learning apparatus embodying the invention. The automatic transmission learning apparatus is used with an automotive vehicle having an internal combustion engine Be, and an automatic transmission AT having a torgue converter TC provided with a lockup mechanism, a gear train GT to which a drive from the engine Be is transmitted through the torque converter TC, and a control valve unit CV.

Figure 2:
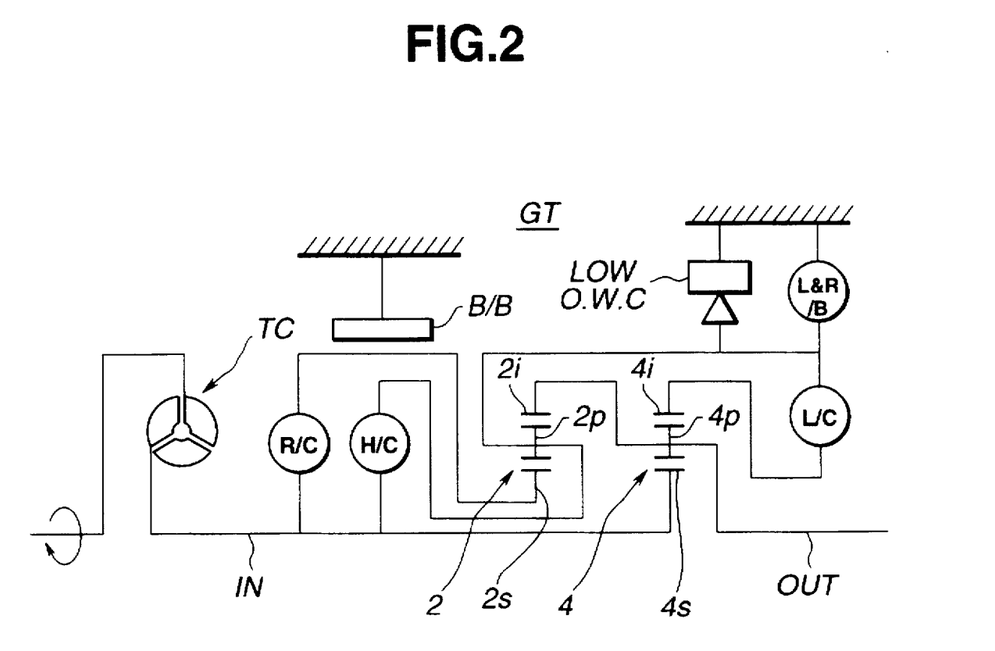
FIG. 2 is a schematic diagram showing a gear train included in the automatic transmission learning control apparatus of FIG. 1.
Figure 3:
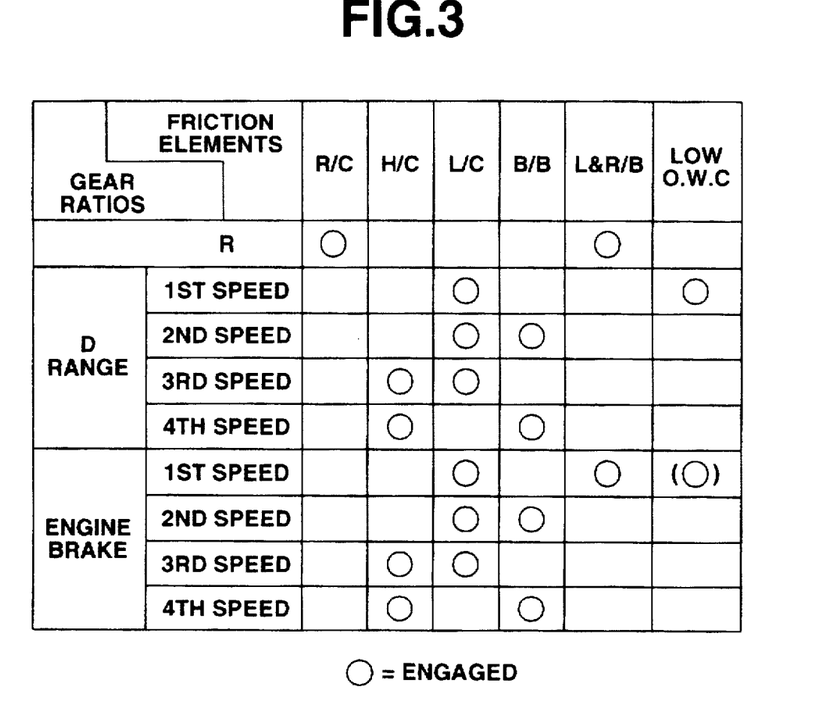
FIG. 3 is a table used in explaining the engaged and disengaged states of the friction elements illustrated in FIG. 2 to effect various speed ratio changes.

Referring to FIG. 2, the gear train GT includes front and rear planetary gear units 2 and 4 arranged in tandem with each other. The front planetary gear unit 2 has a front sun gear 2s, a front pinion gear 2p, a front internal gear 2i and a front carrier 2c. The rear planetary gear unit 4 has a rear planetary gear unit 4 comprised of a rear sun gear 4s, a rear pinion gear 4p, a rear internal gear 4i and a rear carrier 4c. The rear carrier 4c is coupled to the output shaft OUT. The gear train GT also has various friction elements including a reverse clutch R/C through which the front sun gear 2s is connected to the input shaft IN, a high clutch H/C through which the front carrier 2c is connected to the input shaft IN, a low clutch L/C through which the front carrier 2c is connected to the rear internal gear 4i, a band brake B/B for fixing the front sun gear 2s to the housing and a low and reverse brake L&R/B for fixing the front carrier 2c to a grounded or stationary member such as the transmission case. A one-way clutch Low/O.W.C is provided between the front carrier 2c and the housing. Each of the friction elements is switched between its engaged and disengaged states, as shown in FIG. 3, by a hydraulic fluid pressure supplied through the control valve unit CV. The one-way clutch Low/O.W.C is unlocked upon rotation of the front carrier 2c in a forward direction and it is locked upon rotation of the front carrier 2c in the reverse direction.

Returning to FIG. 1, an A/T control unit 10 is provided for controlling the automatic transmission AT. The A/T control unit 10 controls a line pressure solenoid 11, a lockup solenoid 12, a first shift solenoid 13, a second shift solenoid 14, and a timing solenoid 15 to make a gear change in the automatic transmission AT. The A/T control unit 10 effects gear changes based upon existing gear position, vehicle speed, oil temperature, and engine operating conditions. Thus, an inhibitor switch unit 21, a vehicle speed sensor 22, an oil temperature sensor 23 and an input shaft speed sensor 24 are connected to the A/T control unit 10. An idle switch 31, a full-throttle switch 32, a throttle sensor 33 and an engine speed sensor 34 are connected through a conventional ECCS control unit 30 to the A/T control unit 10. The inhibitor switch unit 21 is comprised of various automatic transmission gear position switches including a 1st range switch, a 2nd range switch, a D range switch, a P range switch and an R range switch for producing a signal indicative of the existing gear position of the automatic transmission AT. The vehicle speed sensor 22 is provided at a position for sensing the speed of rotation of the transmission output shaft. The oil temperature sensor 23 is provided for sensing the temperature of the lubrication oil. The input shaft speed sensor 24 is provided for sensing the speed of rotation of the transmission input shaft. The idle switch 31 is associated with the throttle valve situated for controlling the air flow to the engine and it produces a signal when the throttle valve is at its fully-closed position. The full-throttle switch 32 is associated with the throttle valve and it produces a signal when the throttle valve is at its fully-open position. The throttle sensor 33 is associated with the throttle valve and it produces a signal indicative of the degree of opening of the throttle valve. The engine speed sensor 34 is associated with the engine distributor and it produces a pulse signal of a repetitive rate proportional to the engine speed.

Figure 4:
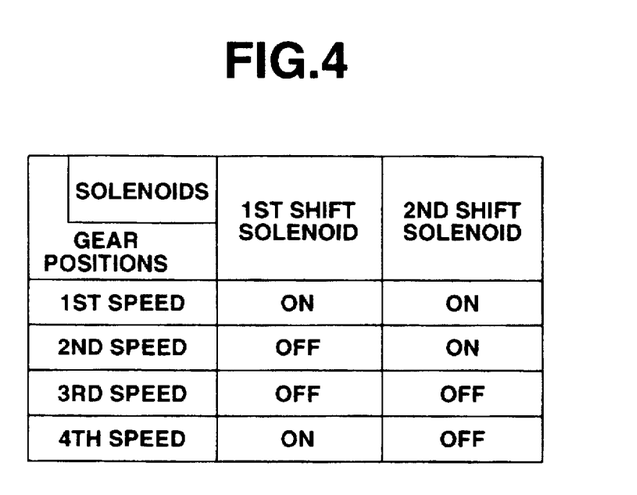
FIG. 4 is a table used in explaining the ON and OFF states of the first and second shift solenoids illustrated in FIG. 1 to effect various speed ratio changes.
Figure 5:
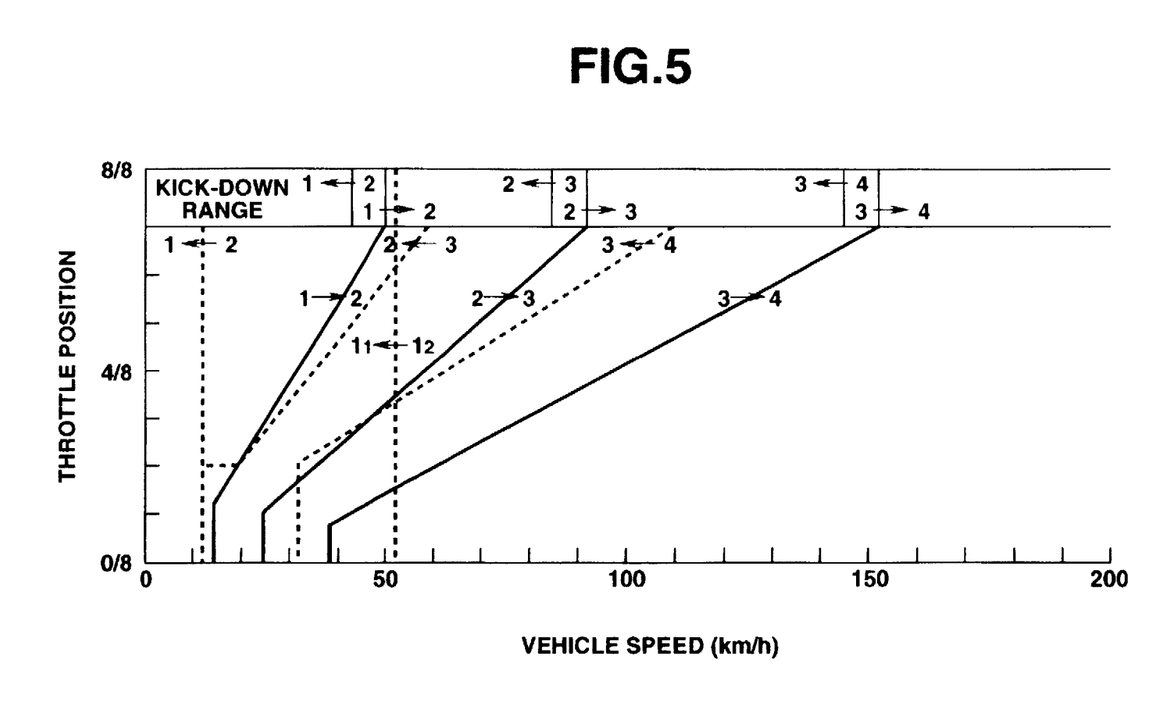
FIG. 5 is a diagram showing a shift schedule used for a shift change control made in the automatic transmission learning control apparatus of FIG. 1.

In the illustrated embodiment, the A/T control unit 10 is arranged to make a gear shift control to effect gear changes by switching the ON and OFF states of the first and second shift solenoids 13 and 14, as shown in FIG. 4. For this purpose, the A/t control unit 10 employs a shift schedule table, as shown in FIG. 5, to produce a change-up command when the operation point represented by throttle valve position and vehicle speed crosses one of the change-up lines, as indicated by the solid lines of FIG. 5, and a change-down command when the operation point crosses one of the change-down lines, as indicated by the broken lines of FIG. 5. The line pressure solenoid 11 operates on a control signal having a variable pulse width or duty cycle fed from the A/T control unit 10 to provide an appropriate line pressure PL.

The A/T control unit 10 employs a digital computer which includes a central processing unit (CPU), a random access memory (RAM), a read only memory (ROM), and an input/output control unit (I/O). The central processing unit communicates with the rest of the computer via a data bus. The input/output control unit includes an analog-to-digital converter which receives analog signals from the various sensors and converts the received signals into corresponding digital signals for application to the central processing unit. The read, only memory contains the programs for operating the central processing unit and further contains appropriate data in look-up tables (relationship) used for gear shift control. The random access memory has a plurality of memory locations which correspond to the respective ranges into which the entire throttle valve position range from 0 to 1 is divided, for storing correction factors (parameters) used in calculating appropriate values for the duty cycle of the control signal applied to the line pressure solenoid 11. A control word specifying a desired duty cycle is periodically transferred by the central processing unit to the control circuit which converts it into a control signal to the line pressure solenoid 11 for providing an appropriate line pressure PL.

Figure 6:
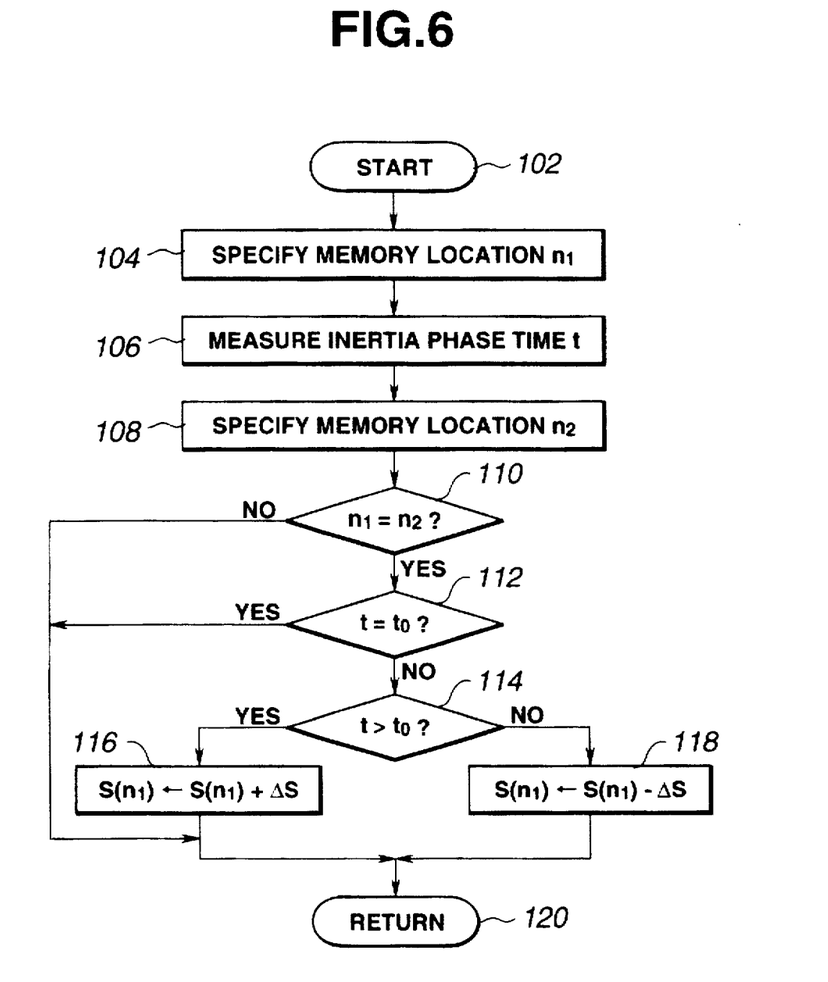
FIG. 6 is a flow diagram illustrating the programming of the digital computer as it is used to update correction factors used for line pressure control.
Figure 7:
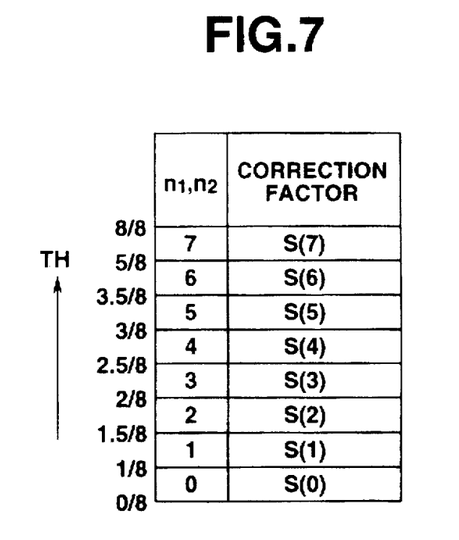
FIG. 7 is a table showing correction factors stored in the respective memory locations specified by throttle valve position.
Figure 8:
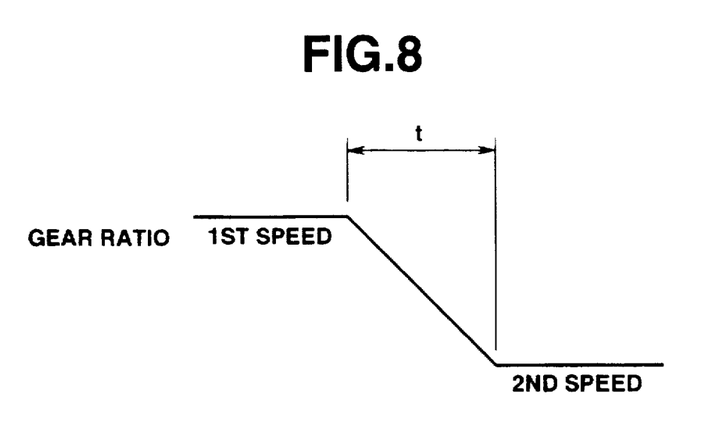
FIG. 8 is a graph showing a change from first to second gear.

FIG. 6 is a flow diagram illustrating the programming of the digital computer as it is used to update the correction factors stored in the corresponding memory locations. The computer program is entered at the point 102. At the point 104 in the. program, a memory location $n_1$ is specified for the throttle valve position TH measured when the gear shift operation is initiated. This specification is made from a table which defines the memory location as a function of throttle valve position, as shown in FIG. 7. For example, the memory location $n_1$ is 3 when the throttle valve position TN is in the range of 2/8 to 2.5/8. At the point 106, a physical quantity (in the illustrated case an inertia phase time t) is measured. The inertia phase time t is the time required for the gear ratio obtained in the automatic transmission to change from the first speed to the second speed in the case of a change up from first to second gear, as shown in FIG. 8. The gear ratio is calculated as the ratio of the transmission input and output shaft speeds. At the point 108 in the program, a memory location $n_2$ is specified for the throttle valve position TH measured when the gear shift operation is completed. This specification is made from the table which defines the memory location as a function of throttle valve position, as shown in FIG. 7. For example, the memory location $n_2$ is 3 when the throttle valve position TH is in the range of 2/8 to 2.5/8.

At the point 110 in the program, a determination is made as to whether the calculated memory location $n_1$ is equal to the calculated memory location $n_2$. If the answer to this question is "yes", then the program proceeds to the point 112. Otherwise, the program proceeds to the point 120 where the computer program is returned to the point 104. At the point 112 in the program, a determination is made as to whether the measured inertia phase time t is equal to a target value $t_0$. The target value $t_0$, which may be determined based on gear shift operation mode and/or throttle valve position, corresponds to a lien pressure suitable to prevent shocks during gear shift operation and prevent the friction element from having its durability reduced. If the answer to this question is "yes", then the program proceeds to the point 120. Otherwise, the program proceeds to another determination step at the point 114. This determination is as to whether the calculated inertia phase time t is greater than the target value to. If the answer to this question is "yes", then the program proceeds to the point 116 where a predetermined value ΔS is added to the correction factor $S(n_1)$ to update the correction factor $S(n_1)$ stored in the specified memory location $n_1$ and then to the point 120. Otherwise, the program proceeds to the point 118 where the predetermined value ΔS is subtracted from the correction factor $S(n_1)$ to update the correction factor $S(n_1)$ stored in the specified memory location $n_1$ and then to the point 120.

Figure 9A:
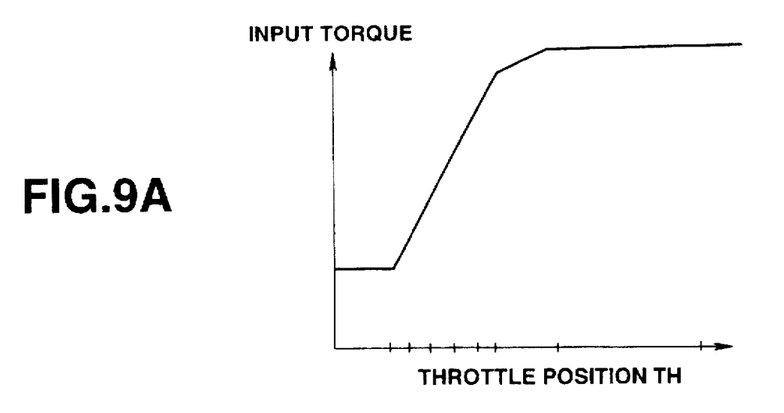
FIG. 9A is a graph of throttle valve position TH versus automatic transmission input torque.
Figure 9B:
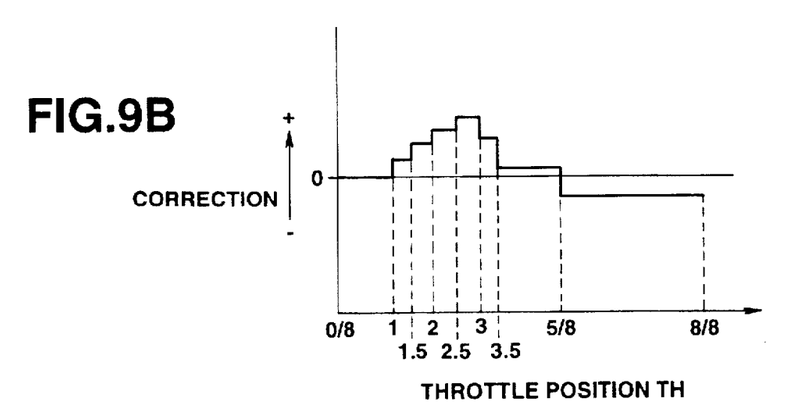
FIG. 9B is a graph of throttle valve position TH versus correction factor.

In this embodiment, the entire throttle valve position range is divided into eight ranges whose widths decrease as the rate of change of the torque inputted to the automatic transmission with respect to the throttle valve position change increases, as shown in FIGS. 9A and 9B. That is, the entire throttle valve position range is divided into a first range from 0/8 to 1/8, a second range from 1/8 to 1.5/8, a third range from 1.5/8 to 2/8, a fourth range from 2/8 to 2.5/8, a fifth range from 2.5/8 to 3/8, a sixth range from 3/8 to 3.5/8, a seventh range from 3.5/8 to 5/8, and an eighth range from 5/8 to 8/8. The eighth range extends from the middle throttle valve position (5/8) to the maximum throttle valve position (8/8).

Figure 10:
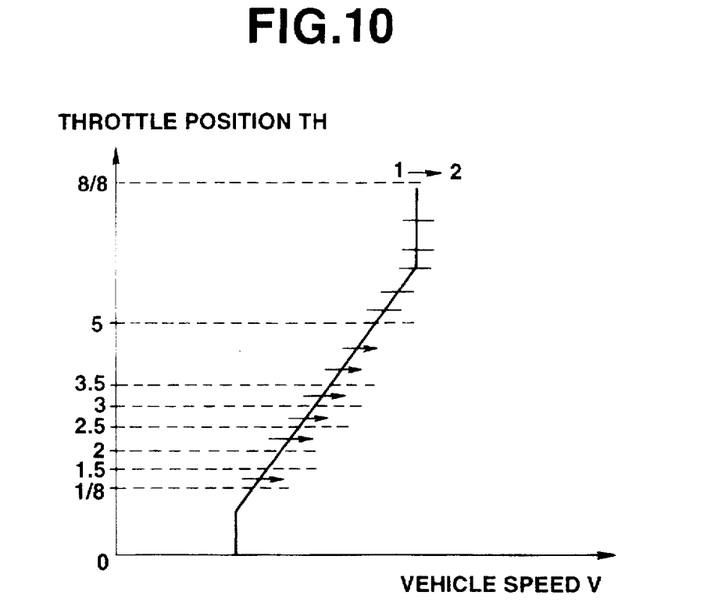
FIG. 10 is a graph of vehicle speed V versus throttle valve position TH.

The central processing unit reads a correction factor stored in the memory location in the random access memory (RAM) corresponding to the existing throttle valve position, calculates a desired value for the line pressure PL by adding the read correction factor to a reference line pressure, and produces a control word specifying the calculated desired line pressure value. For example, when a change up from first to second gear is required, the line pressure PL is controlled, as shown in FIG. 10, for each of the throttle valve position ranges. A greater number of throttle valve position ranges are provided for the throttle valve positions ranging from 1/8 to 3.5/8 than for the throttle valve positions ranging from 0/8 to 1/8 and from 5/8 to 8/8. It is, therefore, possible to ensure smooth gear shift operation and good gear shift feel when the throttle valve position is in the range from 1/8 to 3.5/8 and to shorten the time required for the correction factors to reach their appropriate value during the learning operation when the throttle valve position is in the range from 0/8 to 1/8 or from 5/8 to 8/8. That is, the throttle valve position ranges have a smaller width for a throttle valve position causing a greater rate of change of the automatic transmission input torque with respect to throttle valve position changes. It is, therefore, possible to ensure smooth gear shift operation and good gear shift feel when the throttle valve position is in a range causing a greater rate of change of the automatic transmission input torque with respect to the throttle valve position change and to shorten the time required for the correction factors to reach their appropriate values during the learning operation when the throttle valve position is in a range where the gear shift operation is required at a small frequency.

Figure 11:
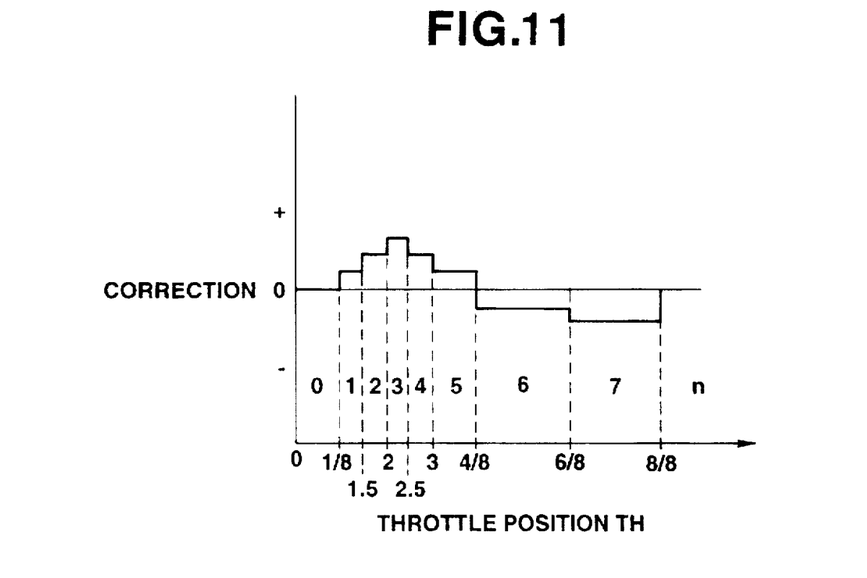
FIG. 11 is a graph of throttle valve position TH versus correction factor.

FIG. 11 shows a modified form of the manner where the entire throttle valve position range is divided into a first range from 0/8 to 1/8, a second range from 1/8 to 1.5/8, a third range from 1.5/8 to 2/8, a fourth range from 2/8 to 2.5/8, a fifth range from 2.5/8 to 3/8, a sixth range from 3/8 to 4/8, a seventh range from 4/8 to 5/8, and an eighth range from 6/8 to 8/8. The throttle valve position range extending from the middle throttle valve position (4/8) to the maximum throttle valve position (8/8) is divided into the seventh range from 4/8 to 5/8 and the eighth range from 6/8 to 8/8.

Figure 12:
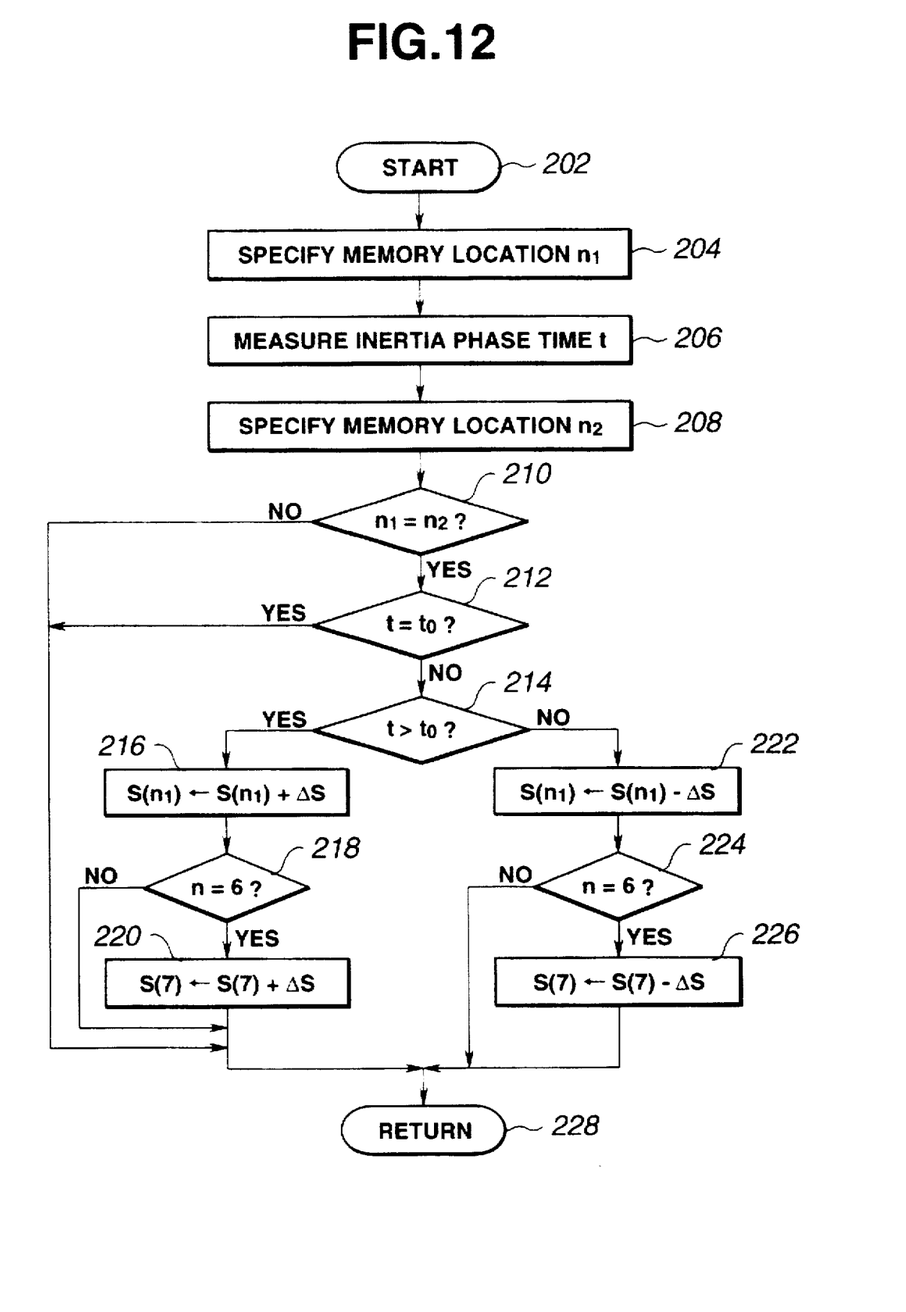
FIG. 12 is a flow diagram illustrating a modified form of the programming of the digital computer as it is used to update correction factors used for line pressure control.

FIG. 12 is a flow diagram illustrating a modified form of the programming of the digital computer as it is used to update correction factors stored in the corresponding memory locations of the random access memory (RAM). The computer program is entered at the point 202. At the point 204 in the program, a memory location $n_1$ as specified for the throttle valve position TH measured when the gear shift operation is initiated. This specification is made from a table which defines the memory location as a function of the throttle valve position TH, as shown in FIG. 7. For example, the memory location $n_1$ is 4 when the throttle valve position TH is in the range of 2.5/8 to 3/8. At the point 206, a physical quantity (in the illustrated case an inertia phase time t) is measured. The inertia phase time t is the time-required for the gear ratio obtained in the automatic transmission to change from the first speed to the second speed in the case of a change up from first to second gear, as shown in FIG. 8. The gear ratio is calculated as the ratio of the transmission input and output shaft speeds. At the point 208 in the program, a memory location $n_2$ is specified for the throttle valve position TH measured when the gear shift operation is completed. This specification is made from the table which defines the memory location as a function of throttle valve position, as shown in FIG. 7. For example, the memory location $n_2$ is 4 when the throttle valve position TH is in the range of 2.5/8 to 3/8.

At the point 210 in the program, a determination is made as to whether the calculated memory location $n_1$ is equal to the calculated memory location $n_2$. If the answer to this question is "yes", then the program proceeds to the point 212. Otherwise, the program proceeds to the point 228 where the computer program is returned to the point 204. At the point 212 in the program, a determination is made as to whether the measured inertia phase time t is equal to a target value $t_0$. If the answer to this question is "yes", then the program proceeds to the point 228. Otherwise, the program proceeds to another determination step at the point 214. This determination is as to whether the calculated inertia phase time t is greater than the target value $t_0$. If the answer to this question is "yes", then the program proceeds to the point 216 where a predetermined value ΔS is added to the correction factor $S(n_1)$ to update the correction factor $S(n_1)$ stored in the specified memory location $n_1$. At the point 218 in the program, a determination is made as to whether or not the specified memory location n is equal to 6. If the answer to this question is "yes", then the program proceeds to the point 220 where the predetermined value ΔS is added to the correction factor S(7) to update the correction factor S(7) stored in the memory location 7 and then to the point 228. Otherwise, the program proceeds directly to the point 228.

If the answer to the question inputted at the point 214 is "no", then the program proceeds to the point 222 where the predetermined value ΔS is subtracted from the correction factor $S(n_1)$ to update the correction factor $S(n_1)$ stored in the memory location $n_1$. At the point 224 in the program, a determination is made as to whether or not the specified memory location n is equal to 6. If the answer to this question is "yes", then the program proceeds to the point 226 where the predetermined value ΔS is subtracted from the correction factor S(7) to update the correction factor S(7) stored in the memory location 7 and then to the point 228. Otherwise, the program proceeds directly to the point 228.

In this modification, the correction factor will be updated for the throttle valve position range from 6/8 to 8/8 always if the correction factor is updated for the throttle valve position range from 4/8 to 6/8. This is effective to shorten the time required for the correction factors to reach their appropriate values during the learning operation when the throttle valve position is in the range of 6/8 to 8/8 where the gear shift operation is required at a very small frequency.

Figure 13:
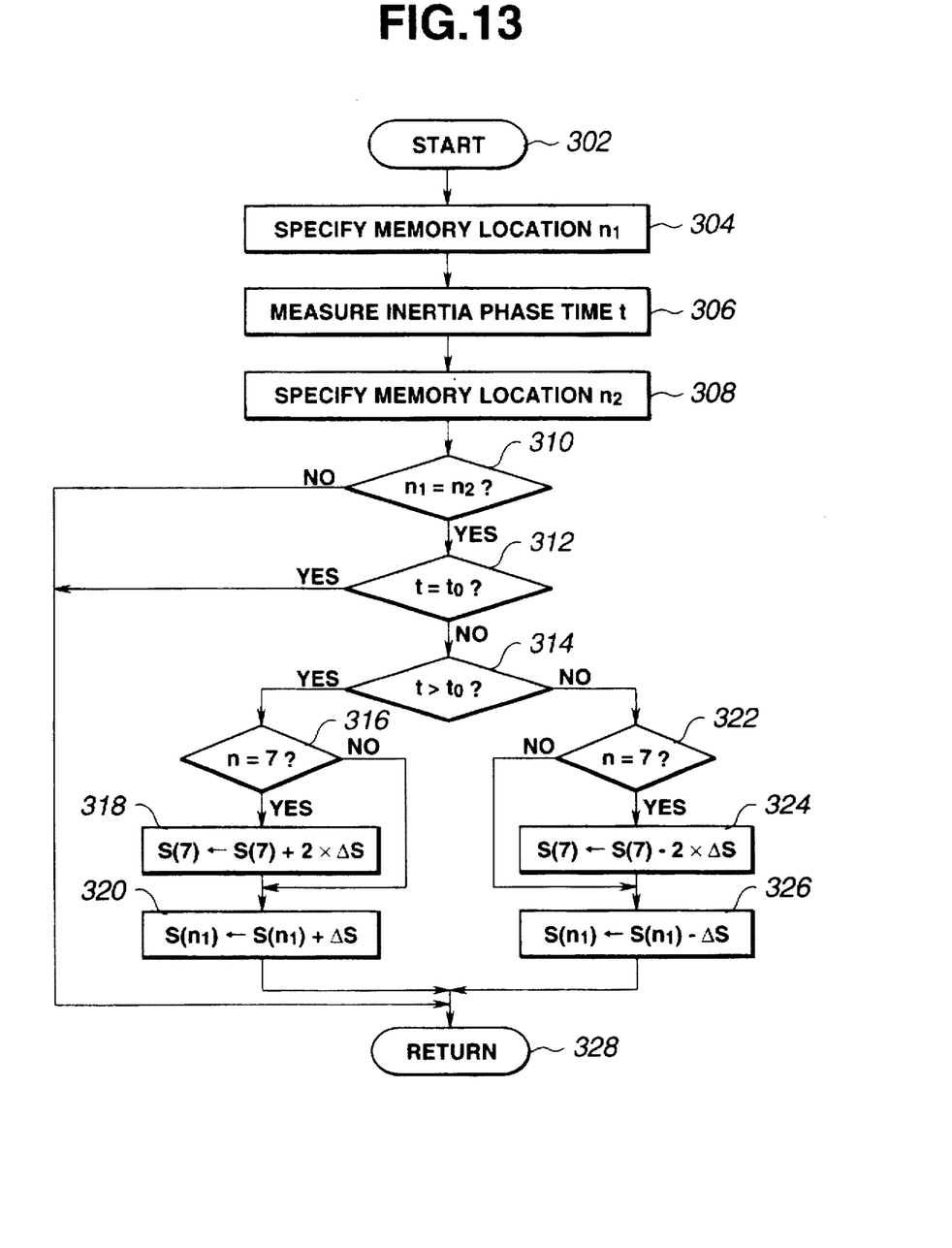
FIG. 13 is a flow diagram illustrating another modified form of the programming of the digital computer as it is used to update correction factors used for line pressure control.

FIG. 13 is a flow diagram illustrating another modified form of the programming of the digital computer as it is used to update correction factors stored in the corresponding memory locations of the random access memory (RAM). The computer program is entered at the point 302. At the point 304 in the program, a memory location n1 is specified for the throttle valve position TH measured when the gear shift operation is initiated. This specification is made from a table which defines the memory location as a function of throttle valve position, as shown in FIG. 7. For example, the memory location $n_1$ is 5 when the throttle valve position TH is in the range of 3/8 to 3.5/8. At the point 306, a physical quantity (in the illustrated case an inertia phase time t) is measured. The inertia phase time t is the time required for the gear ratio obtained in the automatic transmission to change from the first speed to the second speed in the case of a change up from first to second gear, as shown in FIG. 8. The gear ratio is calculated as the ratio of the transmission input and output shaft speeds. At the point 308 in the program, a memory location $n_2$ is specified for the throttle valve position TH measured when the gear shift operation is completed. This specification is made from the table which defines the memory location as a function of throttle valve position, as shown in FIG. 7. For example, the memory location $n_2$ is 5 when the throttle valve position TH is in the range of 3/8 to 3.5/8.

At the point 310 in the program, a determination is made as to whether or not the calculated memory location $n_1$ is equal to the calculated memory location $n_2$. If the answer to this question is "yes", then the program proceeds to the point 312. Otherwise, the program proceeds to the point 328 where the computer program is returned to the point 304. At the point 312 in the program, a determination is made as to whether or not the measured inertia phase time t is equal to a target value to. If the answer to this question is "yes", then the program proceeds to the point 328. Otherwise, the program proceeds to another determination step at the point 314. This determination is as to whether or not the calculated inertia phase time t is greater than the target value $t_0$. If the answer to this question is "yes", then the program proceeds to another determination step at the point 316. This determination is as to whether or not the specified memory location n is equal to 7. If the answer to this question is "yes", then the program proceeds to the point 318 where a value (2×ΔS) double the predetermined value ΔS is added to the correction factor S(7) to update the correction factor S(7) stored in the memory location 7 and then to the point 320. Otherwise, the program proceeds directly to the point 320. At the point 320 in the program, the predetermined value ΔS is added to the correction factor $S(n_1)$ to update the correction factor $S(n_1)$ located in the memory location $n_1$. Following this, the program proceeds to the point 328.

If the answer to the question inputted at the point 314 is "no", then the program proceeds to another determination step at the point 322. This determination is as to whether the specified memory location n is equal to 7. If the answer to this question is "yes", then the program proceeds to the point 324 where a value (2×ΔS) double the predetermined value ΔS is subtracted from the correction factor S(7) to update the correction factor S(7) stored in the memory location 7 and then to the point 326. Otherwise, the program proceeds directly to the point 326. At the point 326 in the program, the predetermined value ΔS is subtracted from the correction factor $S(n_1)$ to update the correction factor $S(n_1)$ stored in the memory location $n_1$. Following this, the program proceeds to the point 328.

In this modification, if the correction factor is updated for the throttle valve position range from 6/8 to 8/8, a value double the value used for the other throttle valve position ranges is added or subtracted from the correction factor. This is effective to shorten the time required for the correction factors to reach their appropriate values during the learning operation when the throttle valve position is in the range of 6/8 to 8/8 where the gear shift operation is required at a very low frequency.

While the invention has been described in connection with the inertia phase time t that it takes the gear shift operation to be completed after the gear shift operation is initiated, it is to be understood that the parameter may be taken in the form of a time required to complete the gear shift operation after detection of a requirement for the gear shift operation. While the invention has been described in connection with a line pressure control, it is to be understood that the invention is also applicable to control the engine torque or the pressure applied to the friction element. While the invention has been described in conjunction with specific embodiments thereof, it is evident that many alternatives, modifications and variations will be apparent to those skilled in the art. Accordingly, the invention is intended to embrace all alternatives, modifications and variations that fall within the scope of the appended claims.

What is claimed is:

1. An automatic transmission learning control apparatus for use in an automotive vehicle including an internal combustion engine having a throttle valve and an automatic transmission, the apparatus comprising:

sensor means sensitive to a degree to which the throttle valve opens for producing a first sensor signal indicative of a sensed throttle valve position;

physical quantity measuring means for measuring a physical quantity related to a gear shift operation made in the automatic transmission;

memory means for storing parameters in memory locations specified for respective throttle valve position ranges, the throttle valve position ranges being narrower for a throttle valve position causing a greater rate of change of a torque inputted to the automatic transmission with respect to a throttle valve position change;

means for determining a target value;

updating means for updating the parameter stored in the memory location specified by the throttle valve position range including the sensed throttle valve position in a direction that would bring the physical quantity into agreement with the target value; and control means for employing the parameter stored in the memory location specified by the throttle valve position range including the sensed throttle valve position to control the gear shift operation.

2. The automatic transmission learning control apparatus as claimed in claim 1, wherein the physical quantity measuring means includes means for measuring an inertia phase time, wherein the control means includes means for controlling a line pressure used in the automatic transmission to effect the gear shift operation, and wherein the updating means includes means for correcting the parameter in a direction to bring the measured inertia phase time into agreement with a target value.

3. The automatic transmission learning control apparatus as claimed in claim 2, wherein the memory means includes means for storing a parameter in a memory location specified by a throttle valve position range extending from a middle throttle valve position to a maximum throttle valve position.

4. The automatic transmission learning control apparatus as claimed in claim 2, wherein the memory means includes means for storing a parameter in a first memory location specified by a first throttle valve position range and a parameter in a second memory location specified by a second throttle valve position range adjacent to the first throttle valve position range, the second throttle valve position range including a maximum throttle valve position, and wherein the updating means includes means for correcting the parameter stored in the second memory location when the parameter stored in the first memory location is corrected.

5. The automatic transmission learning control apparatus as claimed in claim 2, wherein the memory means includes means for storing a parameter in a first memory location specified by a first throttle valve position range and a parameter in a second memory location specified by a second throttle valve position range adjacent to the first throttle valve position range, the second throttle valve position range including a maximum throttle valve position, and wherein the updating means includes means for correcting the parameter stored in the second memory location to a greater extent when the parameter stored in the second memory location is corrected than when one of the parameters stored in the other memory locations is corrected.

6. The automatic transmission learning control apparatus as claimed in claim 1, wherein the memory means includes means for storing a parameter in a memory location specified by a throttle valve position range extending from a middle throttle valve position to a maximum throttle valve position.

7. The automatic transmission learning control apparatus as claimed in claim 1, wherein the memory means includes means for storing a parameter in a first memory location specified by a first throttle valve position range and a parameter in a second memory location specified by a second throttle valve position range adjacent to the first throttle valve position range, the second throttle valve position range including a maximum throttle valve position, and wherein the updating means includes means for correcting the parameter stored in the second memory location when the parameter stored in the first memory location is corrected.

8. The automatic transmission learning control apparatus as claimed in claim 1, wherein the memory means includes means for storing a parameter in a first memory location specified by a first throttle valve position range and a parameter in a second memory location specified by a second throttle valve position range adjacent to the first throttle valve position range, the second throttle valve position range including a maximum throttle valve position, and wherein the updating means includes means for correcting the parameter stored in the second memory location to a greater extent when the parameter stored in the second memory location is corrected than when one of the parameters stored in the other memory locations is corrected.

* * * * *